US009210196B2

(12) United States Patent
Aström et al.

(10) Patent No.: US 9,210,196 B2
(45) Date of Patent: Dec. 8, 2015

(54) METHOD AND APPARATUS FOR IDENTIFYING AN IMS SERVICE

(71) Applicant: Optis Wireless Technology, LLC, Plano, TX (US)

(72) Inventors: Bo Aström, Stockholm (SE); Mats Stille, Bromma (SE); Anders Ryde, Saltsjöbaden (SE); Stephen Terrill, Madrid (ES); Bror Lennart Norell, Alvsjo (SE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

(21) Appl. No.: 14/658,765

(22) Filed: Mar. 16, 2015

(65) Prior Publication Data
US 2015/0188950 A1 Jul. 2, 2015

Related U.S. Application Data

(63) Continuation of application No. 13/959,075, filed on Aug. 5, 2013, now Pat. No. 8,984,146, which is a continuation of application No. 13/608,082, filed on Sep. 10, 2012, now Pat. No. 8,572,261, which is a continuation of application No. 11/914,796, filed as application No. PCT/EP2005/052402 on Jan. 9, 2008, now Pat. No. 8,285,852.

(51) Int. Cl.
*H04L 29/06* (2006.01)
*H04L 29/08* (2006.01)

(52) U.S. Cl.
CPC ........ *H04L 65/1006* (2013.01); *H04L 65/1073* (2013.01); *H04L 65/40* (2013.01); *H04L 67/141* (2013.01); *H04L 65/1016* (2013.01)

(58) Field of Classification Search
None
See application file for complete search history.

(56) References Cited

U.S. PATENT DOCUMENTS

2004/0223489 A1* 11/2004 Rotsten et al. ............... 370/352
2006/0092269 A1* 5/2006 Baird et al. ................ 348/14.08
2006/0153352 A1* 7/2006 Schmidt et al. .......... 379/202.01

* cited by examiner

*Primary Examiner* — Thai Nguyen
(74) *Attorney, Agent, or Firm* — Vincent J. Allen; Stephen Y. Liu; Carstens & Cahoon, LLP

(57) ABSTRACT

A method of indicating the IP Multimedia Subsystem communication service(s) to which a Session Initiation Protocol message relates, the method comprising including one or more communication service identifier(s) in the Session Initiation Protocol message as a Feature Tag of the message.

12 Claims, 10 Drawing Sheets

INVITE sip: SIP-URI1@operator.com SIP/2.0
To: sip:S-CSCF@operator.com
Accept-Contact: audio; video; data; +g.communication.service=p2p.multimedia
//SDP part
Content-Type: application/SDP
Content-Disposition: session v=0
o=PUI1 56773860 7089898 IN IP4 192.0.0.2
s=-
c= IP4 192.0.0.2
t=0
m=audio 20000 RTP/AVP 0
a= sendrecv

*Figure 4*

```
INVITE sip: SIP-URI1@operator.com SIP/2.0
To: sip:S-CSCF@operator.com
Accept-Contact: audio; video; data;
;+g.communication service id=p2p.multimedia
;+g. application-ref=operator-specific-multimedia-player
//SDP part
Content-Type: application/SDP
Content-Disposition: session v=0
o=PUI1 56773860 7089898 IN IP4 192.0.0.2
s=-
c= IP4 192.0.0.2
t=0
m=video 20000 RTP/AVP 0
a= 3gpp.VideoSharing
a= sendrecv
```

Figure 8

```
INVITE sip: SIP-URI1@operator.com SIP/2.0
To: sip:S-CSCF@operator.com
Accept-Contact: audio; video; data;
 ; +g.communication service Id=p2p.multimedia
 ; +g.application-ref=OperatorOfficeHelper Required
 ; +g.mcs-qualifier= p2p.multimedia, "SIP Session Call-Id-value"
 ; +g.mcs-qualifier= CS-Speech, MSISDN
//SDP part
Content-Type: application/SDP
Content-Disposition: session v=0
o=PUI1 56773860 7089898 IN IP4 192.0.0.2
s=-
c= IP4 192.0.0.2
t=0
m=video 20000 RTP/AVP 0
a= 3gpp.VideoHelper
a= sendrecv
```

Figure 10

MESSAGE sip: SIP-URI1@operator.com SIP/2.0
To: sip:S-CSCF@operator.com
Accept-Contact:
;+g.communication service Id= ims.messaging
;+g.application-ref=VodafoneOfficeHelper Required
;+g. mcs-qualifier= p2p.multimedia, "SIP Session Call-Id"
;+g. mcs-qualifier= CS-Speech, MSISDN
;+g. mcs-qualifier= ims.messaging

Figure 11

METHOD AND APPARATUS FOR IDENTIFYING AN IMS SERVICE

FIELD OF THE INVENTION

The present invention relates to a method and apparatus for identifying an IP Multimedia Subsystem (IMS) service, and in particular for identifying an IMS service to which an IMS communication or communication request relates.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Release 5 and Release 6), IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCE.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, the may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF used on the received capabilities. [It is noted that S-CSCF allocation is also carried for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Intial Filter Criteria (IFC) are used by an S-CSCF to determine which Applications Servers that should be "linked in" during a SIP Session establishment. The IFCs are received by the S-CSCF from an HSS during the IMS registration procedure as part of a user's User Profile.

FIG. 2 illustrates the IMS Service Control (ISC) interface between an AS and an S-CSCF, as well as other interfaces within the IMS. Although the AS in FIG. 2 is shown as having only a single interface to an S-CSCF, it will be appreciated that in practice the ISC interface will extend across a communication network to which many (or all) of the CSCF servers of a given operators network are connected, allowing an AS to communicate with all of these CSCFs. [Other entities illustrated in FIG. 1 will be well known to those of skill in the art.]

A further interface (Ut) exists between the AS and the user terminal (TS23.002) although this is not shown in the Figure. The Ut interface enables the user to manage information related to his or her services, e.g. creation and assignment of Public Service Identities, management of authorisation policies that are used for example by "presence" services, conference policy management, etc.

SUMMARY OF THE INVENTION

As far as IMS services are required, different communication services are likely to require different handling by the IMS and by user terminals. More particularly:

Different services may require the "linking-in" of different application servers over the ISC interface;

Sessions may be routed to different end user terminals that a given user has registered with the IMS, in dependence upon the service to which the session relates (matching terminal capabilities to service type can be used, for example, to avoid forking);

Different the functional entities in a recipient's terminal may be designated to handle different services (e.g. PoC and P2P Multimedia);

Network operators may have different levels of authorisation for different services;

Different correct media authorisation policies may be applied to different services. For example, voice (audio) in PoC does not require the same Quality of Service support in the network as P2P multimedia, and therefore media will be allocated accordingly.

A network operator may apply different charging rules depending upon the IMS service;

Service interworking requirements (e.g. IMS deferred messaging—MMS) may depend upon the IMS service.

The Session Description Protocol (SDP) of SIP specifies a so-called "m-line" field that defines the initial type of media to be used for an IMS service. For example, the m-line may specify "audio 20000 RTP/AVP 0" or "video 20000 RTP/AVP 0". [The m-line format is defined in the IETF RFC (2327). "2000" is the port number that shall be used and RTP is the protocol. AVPs are defined for different protocols and the values assigned for AVPs have different meanings depending upon the protocols. A certain value can for example express which codec that shall be used.] It has been envisaged that the m-line information can be used to identify the IMS communication service type. However, the success of IMS has meant that there will be a number of different communication services using the same media type. For example, both PoC and person-to-person multimedia might make use of the "audio" media type. The m-line information cannot therefore be used to uniquely identify the IMS communication service. This problem has been identified by the inventors of the present invention in a 3GPP work item titled "IMS Communication Service Identifier (ServID)".

According to a first aspect of the present invention there is provided a method of indicating the IP Multimedia Subsystem communication service(s) to which a Session. Initiation Protocol message relates, the method comprising including one or more communication service identifier(s) in the Session Initiation Protocol message as a Feature Tag of the message, a communication service identifier identifying one of a plurality of communication services.

A SIP message may include one or more communication service identifiers as Feature Tags, e.g. in the case of a SIP REGISTER message.

The Feature Tag may be included in a Contact Header, Accept-Contact, or Reject-Contact header during Registration or as caller preferences during session establishment or message delivery for SIP messages that are not session based, e.g. SIP Message.

According to a second aspect of the present invention there is provided a method of identifying an application, residing at a user terminal, to which a Session Initiation Protocol message relates, the method comprising including an application reference in the Session Initiation Protocol message.

An application reference may be included in the SIP message header as a Feature Tag, e.g. in a Contact header in Register Messages, and Accept-Contact, or Reject-Contact headers in other SIP messages (e.g. INVITE). Alternatively, the application reference may be included as an "a-line", augmenting an "m-line" in an SOP part of the SIP message. Application references may be included both as a Feature Tag and as an a-line in the same SIP message, e.g. identifying a master application and an ancillary application respectively.

A preferred embodiment of the present invention combines the first and second aspects of the present invention. At a user terminal or IMS network node, the IMS stack identifies the appropriate communication service on the basis of a communication service identifier contained in a received Session Initiation Protocol message, and forwards the message to the functional (software) entity that implements this service. This functional entity is herein referred to as the communication service. The communication service that receives the message identifies the appropriate application on the basis of an application reference contained in the Session Initiation Protocol message, and forwards the message to that application.

According to a third aspect of the present invention there is provided a method to allowing a plurality of Communication Services to be associated together within an IP Multimedia Subsystem or at a User Equipment, the method comprising identifying the or each associated service as a Feature Tag in the Session Initiation Protocol message.

For example, the invention may allow association of a plurality of simultaneous IMS communication services, e.g. PP Multimedia with IMS Messaging, and/or to correlate IMS communication services with other simultaneous service sessions, e.g. Circuit Switched-Speech.

In a preferred embodiment of the invention, this third aspect is combined with one or both of the first and second aspect of the invention.

Other aspects of the invention include:
user terminals and network nodes comprising means for inserting into a Session Initiation Protocol message a communication service identifier as a Feature Tag of the message;
user terminals and network nodes comprising means for inserting into a Session Initiation Protocol message an application reference; and
user terminals and network nodes comprising means for inserting into a Session Initiation Protocol message.

According to still further aspects of the invention, one or more new SIP information Elements (parameters) may be standardised to carry one or more of the: Communication Service Identifier, Application Reference, and MCS-Qualifier (the Communication Service association identifier).

BRIEF DESCRIPTION OF THE DRAWINGS

FIG. 4 illustrates an example SIP INVITE message incorporating Communication Service Identifiers;

FIG. 8 illustrates an example SIP INVITE message incorporating Communication Service Identifiers and Application References;

FIG. 10 illustrates an example SIP INVITE message incorporating Communication Service Identifiers, Application References, and Multiple Communication Service Qualifiers; and FIG. 11 illustrates an example SIP Message incorporating Communication Service Identifiers, Application References, and Multiple Communication Service Qualifiers.

DETAILED DESCRIPTION OF CERTAIN EMBODIMENTS

There are a number of benefits from being able to identify the particular IP Multimedia Subsystem (IMS) service to which a Session Initiation Protocol (SIP) message relates. These have already been considered above. It is proposed here to facilitate this identification by including in the SIP message a "Communication Service Identifier", and in particular by including the Communication Service Identifier as a Feature Tag.

The appropriate Feature Tag is included in one of the Contact (Register), Accept-Contact, or Reject-Contact headers of the SIP message, as one of the "Caller Preferences". Examples of service identifiers are:

"+g.communication service=+g.p2p.multimedia"
"+g.communication service=+g.poc.talkburst"
"+g.communication service=+g.instant.messaging"
"+g.communication service=+g.deferred.multimedia.messaging"

where the suffix, e.g. "multimedia" identifies the IMS communication service.

Figure 1:
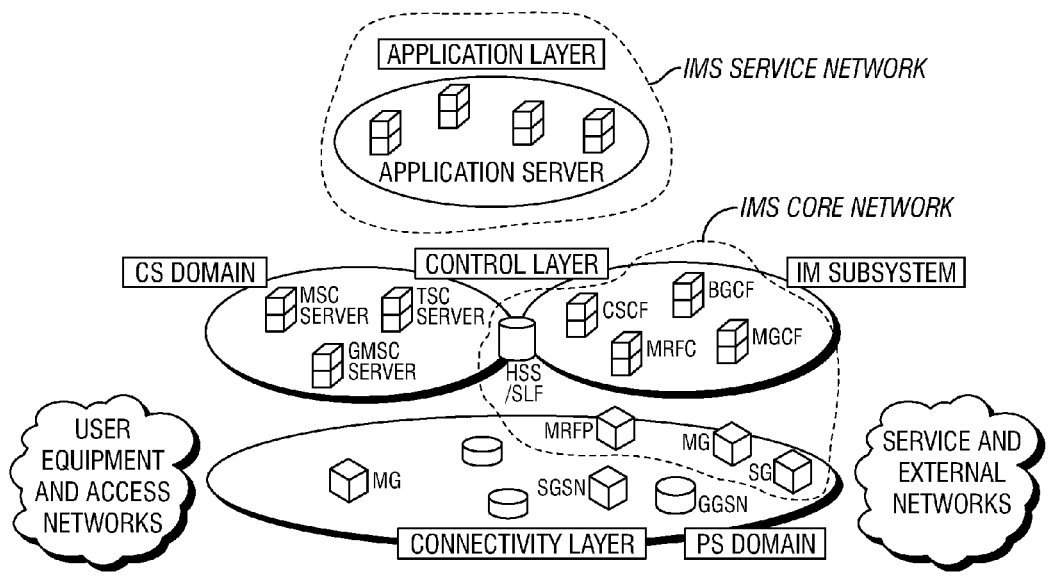
FIG. 1 illustrates schematically the integration of an IP Multimedia Subsystem into a 3G mobile communications system.
Figure 2:
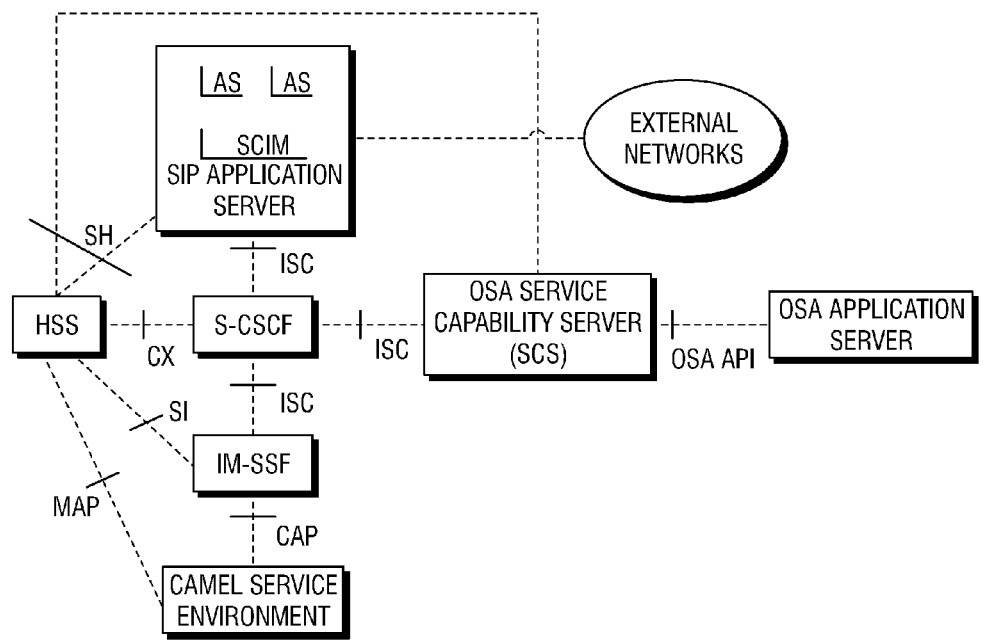
FIG. 2 illustrates schematically certain entities of the IP Multimedia Subsystem including an Application Server and a Serving Call/State Control Function.
Figure 3:
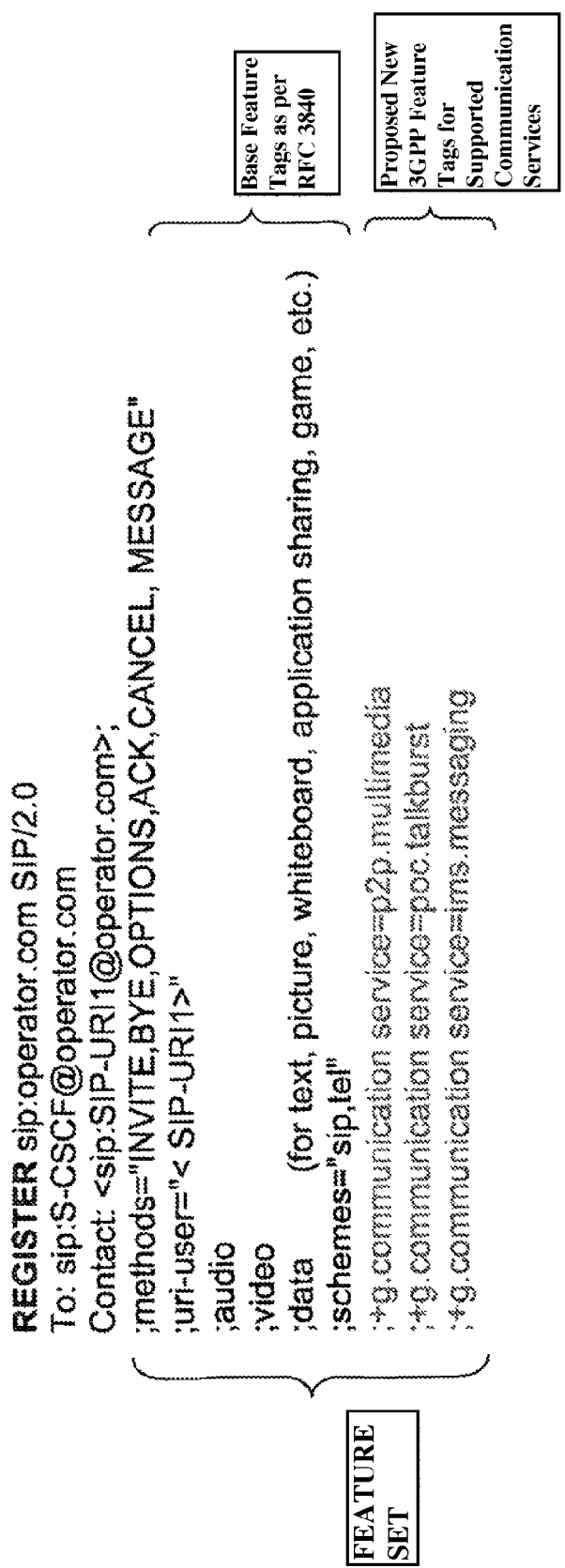
FIG. 3 illustrates an example SIP REGISTER message incorporating Communication Service Identifiers.

FIG. 3 shows the structure (in part) of a SIP REGISTER message which identifies the communication services that are supported by the message sender (User Equipment), by including Communication Service Identifiers in the Contact header. Feature Tags in Register Messages announce a terminal's capabilities to the network. The network (e.g. at the S-CSCF) can use this information to match caller preferences expressed by the originator of a SIP session with the recipient's set of registered terminals that best match the requested caller preferences. In the illustrated example, the supported services are: multimedia; talkburst; and multimedia messaging. Such a REGISTER message is sent by the UE to the Serving Call/Session Control Function (S-CSCF).

FIG. 4 shows the structure (in part) of a SIP INVITE message which is used to start a specific IMS communication service. The INVITE message identifies in the Accept-Contact header the media supported by the initiating UE, i.e. audio, video, data, as well as the service to which the message relates, i.e. person-to-person (p2P) multimedia. The "m-line" of the SDP message part indicates that initially the session is an audio only session. The other media, audio and data identified in the Accept-Contact header are media that may be used in the session but are not used initially. The final recipient of this message is a peer UE, identified by the example "SIP URI SIP-URI1@operator.com". However, it is likely that the S-CSCF serving the initiating UE will examine the message, and may decide whether or not to forward the message depending upon the service identified by the Communication Service Identifier. If the subscriber is authorised to use the p2p multimedia service, the INVITE will be forwarded to the recipient UE (chosen, if necessary, on the basis of capabilities). Charging may also be initiated based upon the service, and or SIP ASs linked in to the SIP message path.

As an improvement to the approach described, the Communication Service Identifier in the Feature Tag may be supplemented with the version number of the related service.

Figure 5:
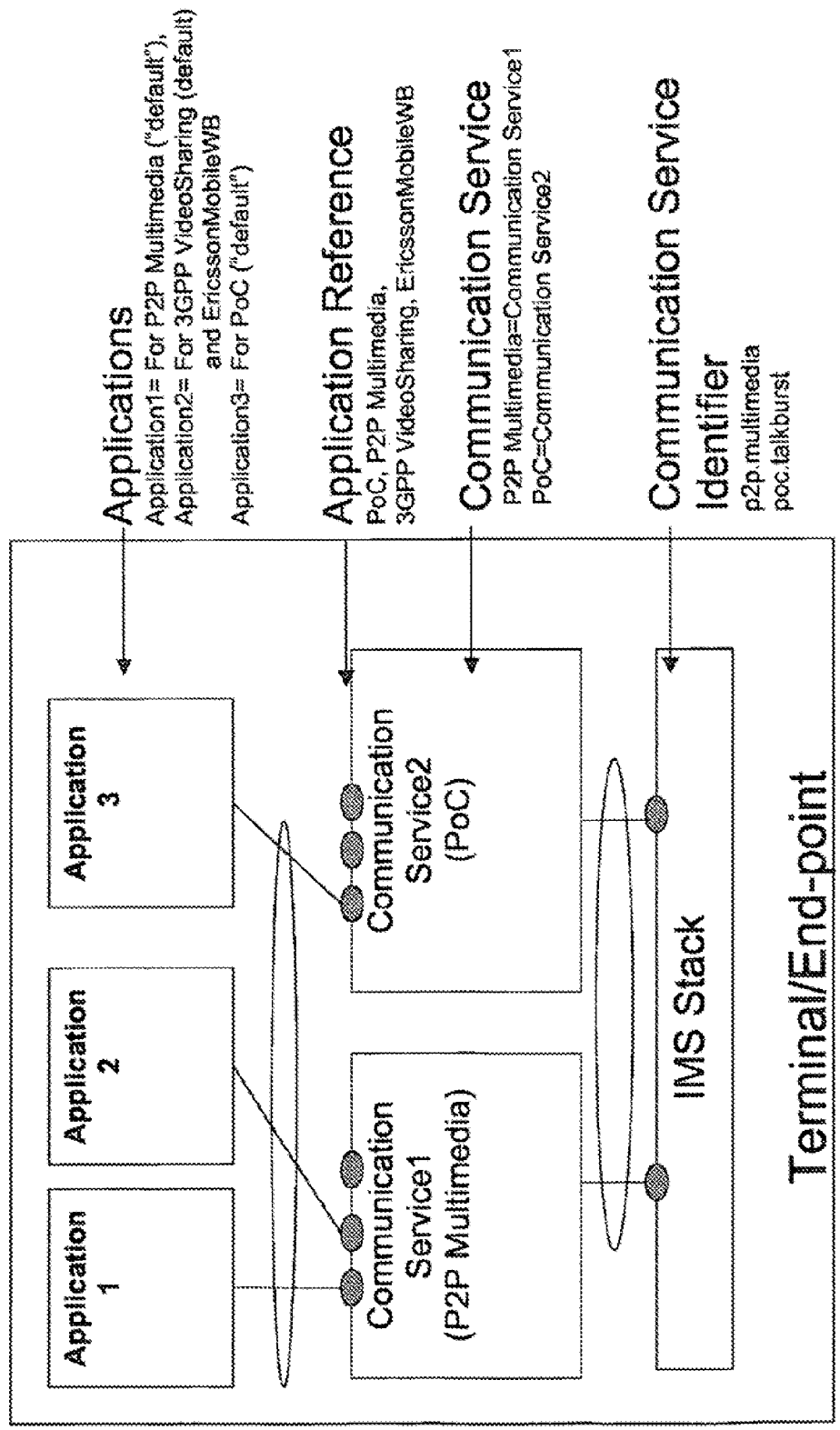
FIG. 5 illustrates schematically a UE architecture that makes use of Communication Service Identifiers and Application References.

In a typical UE, particular (standardised) communications services are likely to be handled by applications that in most cases will be provided "natively" by terminal vendors. These applications may conform to certain agreed standards and are referred to here as "default" applications for standardised IMS communication based service. Examples include default applications for handling p2p multimedia and PoC sessions. Other applications residing in the UEs may not be standardised, for example applications relating to games or company specific office applications. FIG. 5 illustrates the applications and communication services residing at a UE, on top of the IMS stack.

Figure 6:
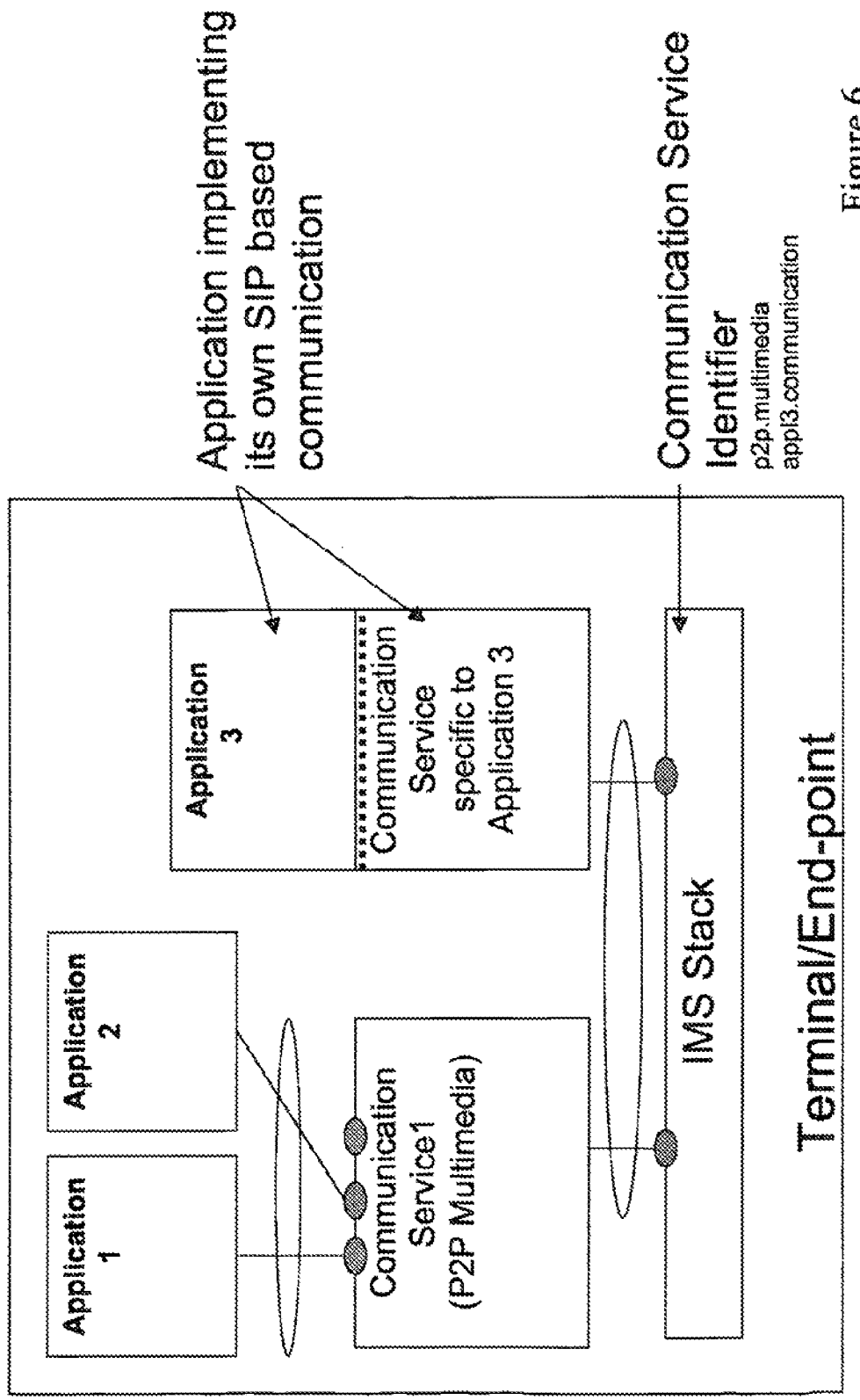
FIG. 6 illustrates schematically a terminal architecture in which one application implements a SIP based communication that is proprietary to the application.

It would be helpful to be able to specify in a SIP message the application that is to be used to handle a particular communication service, by way of an "Application Reference". This is useful when an IMS communication service allows applications to communicate according to the rules, procedures and associated media defined for the communication service. An application that uses an IMS communication service does not implement the SIP communication part of the service, but uses (i.e. "piggybacks on") the communication service for this purpose via an internal interface. The application reference identifies the application sitting on top of a communication service. Note also that it is possible for an application to implement a SIP based communication that is proprietary to the application, and the application would in such a case be identified with a communication service identifier. This is illustrated in FIG. 6.

The Application Reference can be implemented as a Feature Tag or as an "a-line" augmenting an m-line in the SDP part of a SIP message. Both have their advantages and disadvantages Application Reference as a Feature Tag Including the Application Reference as a Feature Tag has the advantage that the mechanism can be used for all SIP Messages (i.e. not only those carrying an SDP). This mechanism also indicates to a recipient end-point, which application shall be used for the communication service to be established. This application will be the "master" application for the session and will govern the addition of media to it. However, the mechanism can only be used at session establishment and is not suitable for indicating "sub-functionality" during an established session, e.g. to clarify that a medium in a Re-Invite shall be used for a certain functionality. For example, using the Feature Tag approach by itself will not allow an expression that Message Session Relay Protocol (MSRP) shall be used for "Whiteboarding" and not "PictureViewer".

Application Reference as an a-Line Augmenting an m-Line in SDP

This mechanism has the advantage that it can be used to address "sub functionality" in an established SIP session. The recipient application is expressed in an a-line that follows the m-line indicating the initial media to be used. However, the mechanism can only be used for SIP messages that carry an SDP body (e.g. not for SIP Message).

By combining these two approaches together, the disadvantages can be avoided. It is therefore proposed to allow the Application Reference to be transferred both as a Feature Tag and in the SDP body. The Feature Tag is used to indicate the "Master Application" for the session. For standardised Communication Services this is the "default application" and its value could be set to the same value as the Communication Service Identifier. For example:

"Communication Service Identifier=P2P Multimedia
Application Reference=P2P Multimedia"

Of course, it may be possible to omit the Application Reference when the application is the default application.

For operator or vendor specific applications that use standardised

Communication Services, the Application Reference contains the name of this application. For example:

"Communication Service Identifier=P2P Multimedia
Application Reference=OperatorOfficeHelper"

The Feature Tag is always used to address a recipient application when the SIP message type does not carry an SDP body (e.g. SIP Message).

An a-line in the SDP body is used to augment an m-line to clarify the context for which the m-line is used, when the SIP message type carries an SDP body (e.g. Invite).

Figure 7:
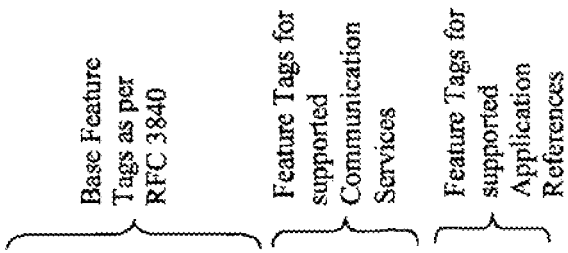
FIG. 7 illustrates an example SIP REGISTER message incorporating Communication Service Identifiers and Application References.

FIG. 7 Illustrates the SIP REGISTER message structure, where the Feature Tags identifying the communication services supported by the sending UE are identified in the Contacts header. FIG. 8 illustrates the SIP INVITE message structure for initiating a session between an initiating UE and a UE identified by the SIP URI SIP-URI SIP-URI1@operator.com. The Communication Service identifier ("+gp2p.multimedia") is included as one Feature Tag, whilst the Application Reference ("+gcommunication service") is included as a second Feature Tag to identify the mast application. An a-line is included to identify a further application ("3gpp.VideoSharing") which may be linked in to the same session by the master application, There exists a need to be able to identify within the IMS and at UEs, simultaneous communication services (both IMS services and other services such as circuit switched (CS) speech) that are associated with an application. An identifier referred to here as "MCS-qualifier", provides an application with the ability to correlate several simultaneous IMS communication service sessions (e.g. P2P Multimedia and IMS Messaging), and to correlate IMS communication services with other non-IMS service sessions, e.g. CS-Speech.

The MCS-Qualifier can be used for example to determine the tariff to be applied to a session. In one example, CS-Speech may be combined with the IMS P2P multimedia service for videosharing implemented in a combinational service (CSI) fashion. The existence of the MCS-Qualifier allows the network to determine this and to apply different charging rules and rates to the IMS communication part for video transfer, charging rules and rates which differ from those that are applied when video is transferred over IMS in "a non-CSI context", i.e. IMS in a standalone context.

Figure 9:
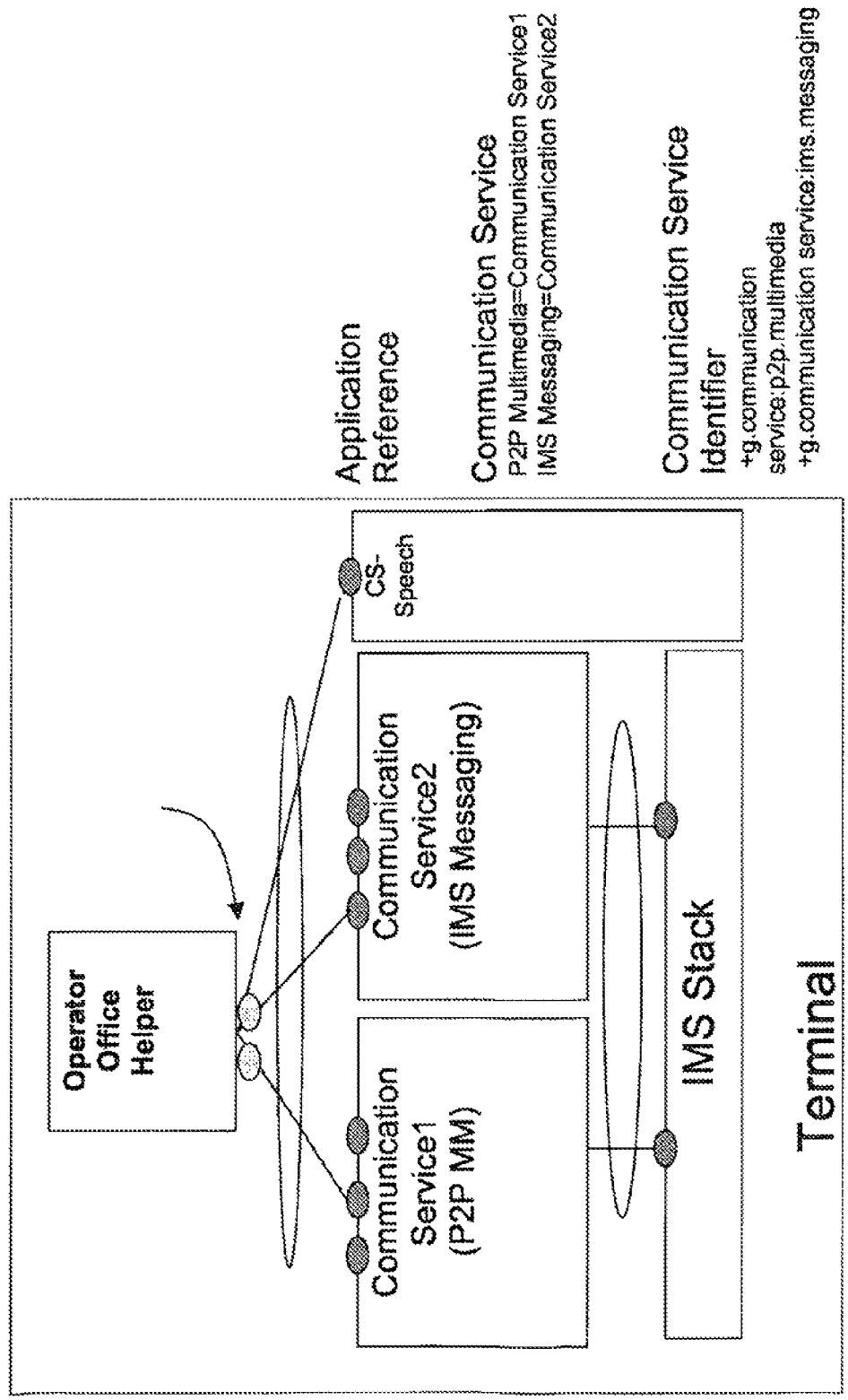
FIG. 9 illustrates schematically a UE architecture that makes use of Communication Service Identifiers, Application References, and Multiple Communication Service Qualifiers.

FIG. 9 illustrates an example where a particular application, in this case a network operator specific help application "OperatorOfficeHelper", uses the IMS communication service p2p multimedia, and the CS-Speech service. In order to have a meaningful communication, OperatorOfficeHelper must be installed on the terminals involved in the communication. Application Reference is set to "OperatorOffice-Helper" and encoded with a Feature Tag. The Communication Service Identifier is set to p2p multimedia, and the MCS-qualifier is set to IMS p2p multimedia and CS-Speech. An example of this SIP INVITE structure incorporating the Multiple Communication Services Identifier is shown in FIG. 10.

FIG. 11 shows an example of the SIP Message structure which might be sent in combination with the CS-Speech and p2p multimedia services. It is assumed in this example that the SIP Message is sent with the IMS Messaging Communication Service. The SIP Message carries the following parameters:

Communication Service Id=IMS Messaging
Application Reference=OperatorOfficeHelper
MCS-Qualifiers, CS-Speech, P2P Multimedia, IMS Messaging It will be appreciated by the person of skill in the art that various modifications may be made to the above described embodiments without departing from the scope of the present invention. For example, other mechanisms could be used to express Communication Service Identifiers, Application references and MCS-Qualifiers in SIP messages. In particular, it is possible to define new SIP Information Elements (Headers/Parameters) for this purpose.

The invention claimed is:

1. A user equipment (UE) for communicating with an IP Multimedia Subsystem (IMS) network node utilizing Session Initiation Protocol (SIP) signaling, the UE comprising:
   memory; and
   a processor coupled to the memory;
   wherein the memory stores computer program instructions executed by the processor to cause the UE to:
   send, to the IMS network node, a SIP message having an IMS communication service identifier, an IMS application reference, and a multiple communication services (MCS) qualifier;
   wherein an IMS protocol stack of the IMS network node is configured to utilize the IMS communication service identifier and the IMS application reference to forward the SIP message to the identified one of a plurality of IMS applications, and
   wherein the IMS protocol stack is configured to utilize the MCS qualifier to correlate one of: several simultaneous IMS communication service sessions or IMS communication services with non-IMS service sessions; and
   wherein the IMS communication service identifier is included in a first feature tag of a header of the SIP message.

2. The UE according to claim 1, wherein the IMS application reference is included in a second feature tag in a header of the Session Initiation Protocol message.

3. The UE according to claim 1, wherein the MCS qualifier is included in a third Feature Tag in a header of the SIP message.

4. The UE according to claim 1, wherein said IMS application reference is included as an "a-line", augmenting an "m-line" in an Session Description Protocol (SDP) part of the SIP message.

5. The UE according to claim 1, wherein a plurality of IMS application references are included in the SIP message as both a Feature Tag and as an a-line.

6. The UE according to claim 5, wherein the IMS application reference included as the Feature Tag identifies a master application, and the application reference included in the a-line identifies an ancillary application.

7. A user equipment (UE) for communicating with an IP Multimedia Subsystem (IMS) network node utilizing Session Initiation Protocol (SIP) signaling, the UE comprising:
   a plurality of IMS application services in communication with an IMS protocol stack;
   a plurality of IMS applications interfaced with the plurality of IMS communication services; and
   wherein the IMS protocol stack of the UE is configured to utilize an IMS communication service identifier and an IMS application reference to forward a SIP message received from the IMS network node to the identified one of the plurality of IMS applications, and
   wherein the IMS protocol stack is configured to utilize an MCS qualifier contained in the Session Initiation Protocol message to correlate one of: several simultaneous IMS communication service sessions or IMS communication services with non-IMS service sessions,
   wherein the UE is configured to read the IMS communication service identifier from a first feature tag in a header of the SIP message.

8. The UE according to claim 7, wherein the UE is configured to read the IMS application reference from a second feature tag in a header of the SIP message.

9. The UE according to claim 7, wherein the UE is configured to read the MCS qualifier from a third feature tag in a header of the SIP message.

10. The UE according to claim 7, wherein the UE is configured to read the application reference from an a-line augmenting an m-line in a Session Description Protocol (SDP) part of the SIP message.

11. The UE according to claim 7, wherein the UE is configured to read a plurality of IMS application references included in the SIP message from both a Feature Tag and from an a-line.

12. The UE according to claim 11, wherein the UE is configured to read the IMS application reference included in the Feature Tag as a master application, and wherein the UE is configured to read the IMS application reference included in the a-line as an ancillary application.

* * * * *